(12) United States Patent
d'Hond et al.

(10) Patent No.: US 6,974,052 B1
(45) Date of Patent: Dec. 13, 2005

(54) DOSING DEVICE ADAPTED FOR DISPENSING A CONCENTRATE FROM A HOLDER IN A METERED MANNER

(75) Inventors: Paul Isodore d'Hond, Zwijndrecht (NL); Albertus Maria Bramer, Culemborg (NL)

(73) Assignee: Sara Lee/DE N.V. (NL)

( * ) Notice: Subject to any disclaimer, the term of this patent is extended or adjusted under 35 U.S.C. 154(b) by 295 days.

(21) Appl. No.: 10/018,232

(22) PCT Filed: Jun. 20, 2000

(86) PCT No.: PCT/NL00/00428

§ 371 (c)(1),
(2), (4) Date: Mar. 26, 2002

(87) PCT Pub. No.: WO00/79224

PCT Pub. Date: Dec. 28, 2000

(30) Foreign Application Priority Data

Jun. 21, 1999 (NL) ............................................. 1012395
Oct. 26, 1999 (NL) ............................................. 1013392
Oct. 26, 1999 (NL) ............................................. 1013393

(51) Int. Cl.⁷ ............................................. B67D 5/08
(52) U.S. Cl. ....................... 222/63; 222/383.2; 417/44.1
(58) Field of Search ............................... 222/129.1, 63, 222/383.2; 417/44.1, 50, 410.1

(56) References Cited

U.S. PATENT DOCUMENTS

| | | | |
|---|---|---|---|
| 2,779,513 A | * | 1/1957 | Dickey ........................ 222/333 |
| 3,575,535 A | | 4/1971 | Bickar |
| 4,334,640 A | | 6/1982 | van Overbruggen |
| 4,507,054 A | * | 3/1985 | Schoenmeyr ................. 417/12 |
| 4,901,886 A | * | 2/1990 | Kirschner ........................ 222/1 |
| 5,197,865 A | * | 3/1993 | Sevrain et al. ............... 417/420 |
| 5,269,443 A | | 12/1993 | Lancaster |
| 5,540,569 A | * | 7/1996 | Altham et al. ............... 417/420 |
| 5,779,456 A | * | 7/1998 | Bowes et al. ................ 417/420 |
| 5,836,482 A | | 11/1998 | Ophardt et al. |
| 6,065,946 A | * | 5/2000 | Lathrop .................. 417/423.14 |

FOREIGN PATENT DOCUMENTS

| | | |
|---|---|---|
| EP | 0067466 | 12/1982 |
| GB | 2103296 | 2/1983 |

* cited by examiner

*Primary Examiner*—Kenneth Bomberg
*Assistant Examiner*—Melvin A Cartagena
(74) *Attorney, Agent, or Firm*—Altera Law Group, LLC

(57) ABSTRACT

The invent related to a dosing device comprising a housing comprising at least one inlet, at least one outlet. The dosing device is adapted for dispensing in a metered manner a viscous concentrate from a holder. The concentrate in diluted condition forms a beverage suitable for consumption. The dosing device is adapted to be connected, in use, to a storage space of the holder. According to the invention, the dosing device comprises a rotor connection to the housing for rotation around a rotation axis, for causing the rotor to rotate about the rotation axis by means of a changing magnetic field, the rotor being mechanically connected to the pump for driving the pump with the rotation rotor.

23 Claims, 5 Drawing Sheets

DOSING DEVICE ADAPTED FOR DISPENSING A CONCENTRATE FROM A HOLDER IN A METERED MANNER

This invention relates to a dosing device comprising a housing comprising at least one inlet, at least one outlet, a liquid flow path extending from the inlet to the outlet, and a pump included in the liquid flow path, the dosing device being adapted for dispensing in a metered manner a viscous concentrate from a holder in which the concentrate is contained, the concentrate in diluted form giving a product suitable for consumption, the holder comprising a storage space in which the concentrate is contained, and the inlet of the dosing device being adapted to be connected, in use, to the storage space of the holder.

Such a device is known from British patent application 2103296. The dosing device described therein comprises a hollow cylinder-shaped body manufactured from a flexible elastic material. The body in question encloses a pumping volume. Further, the device comprises an operating element for compressing the body in an axial direction. The device also comprises a hollow cylinder-shaped housing which is adapted to encompass said body on its outer side at least during the phase in which the pumping volume is reduced. The flexible body is cyclically deformed in an axial direction, with the result that in each cycle a predetermined amount of extract is dispensed. To that end, the operating element is driven by means of a pulsating magnetic field. For driving the operating element, the dosing device is placed in a unit for generating a pulsating magnetic field. In a pulsating magnetic drive, the position of the dosing device with respect to the unit in axial direction of the dosing device is of great influence on the power to be supplied. This makes placing the dosing device in the unit very critical.

Further, the known dosing device has as a disadvantage that its action is dependent on the viscosity of the concentrate. A further disadvantage is that the dosing device is relatively expensive.

The object of the invention is to provide an improved dosing device. To that end, the dosing device according to the invention is characterized in that the dosing device comprises a rotor rotatably connected to the housing for rotation around a rotation axis, for causing the rotor to rotate about the rotation axis by means of a changing magnetic field, the rotor being mechanically connected to the pump for driving the pump with the rotating rotor.

As the dosing device comprises a rotor, it is no longer necessary, as in the known device, to utilize a pulsating drive. Because a pulsating drive can be omitted, the placement of the dosing device in a dispensing machine is no longer critical. A further advantage is that in the diluted form of the concentrate, the so-called zebra effect does not arise because the concentrate is not dispensed in a pulsating manner.

Further, by virtue of the rotor, the dosing device can be of economically advantageous construction.

A further advantage of the device according to the invention is that metering can be set steplessly. Moreover, the dosing device can be designed with small overall dimensions. Furthermore, the rotor can be arranged such that the rotation axis is directed approximately parallel to the direction of the liquid flow path. Such a construction is easy to realize.

According to a preferred embodiment, the rotor is included in the liquid flow path. More particularly, the rotor is included in the liquid flow path upstream of the pump. In these cases, the rotor can also obtain the function of stirrer.

According to a preferred embodiment, the rotor is provided with a magnetizable material, such as soft iron. The rotor will then be magnetized under the influence of the changing magnetic field and proceed to orient in that magnetic field. Because the magnetic field changes, the rotor will start to rotate.

In particular, the rotor comprises a plurality of arms extending in radial direction of the rotation axis. In the magnetic field the ends of these arms will each time be magnetized to form a north or a south pole. For that matter, the rotor can also take other forms. Essential is only that the rotor comprises poles which are magnetized under the influence of the magnetic field to form a north and a south pole. Thus the rotor can also be in the form of, for instance, a bar, an oval, etc.

Preferably, the pump is driven by the rotor by way of a drive shaft of which an axial axis is directed in the direction from the inlet to the outlet. This may provide overall small dimensions to the dosing device. Moreover, the construction is very reliable. As a dynamic liquid sealing of the drive shaft can be omitted, there is relatively little energy loss and there is a very small chance of leakage or contamination. A further advantage is that the concentrate remaining behind in the dosing device after use is hermetically sealed from the outside world.

What is also achieved by virtue of the specific direction of the drive shaft is that the dosing device can be placed in a dispensing machine rotation-independently. The position of the rotor is not critical then. If the dosing device is connected to a holder filled with the concentrate, this connection can likewise be effected rotation-independently.

According to the preferred embodiment, the dosing device comprises a substantially rotation-symmetrical housing of which an axial axis extends in the direction from the inlet to the outlet. In particular, the dosing device is provided, downstream of the pump, with a valve included in the liquid flow path, which opens when the liquid pressure upstream of the valve exceeds a predetermined threshold value. The use of a pump in combination with a pressure relief valve has the advantage that no leakage flow owing to internal play arises in the non-driven condition. Moreover, the valve provides for a microbiological sealing, which is important for beverages suitable for consumption.

Preferably, the pump is designed as a gear pump. Such a pump is very reliable and cheap and may provide a dosing device with small dimensions.

The holder according to the invention is characterized in that it is filled with the concentrate which in diluted condition is suitable for consumption, the holder being fitted with a dosing device according to the invention as described hereinbefore.

As the dosing device according to the invention, viewed in axial direction, can be made of low design, less length, viewed in this direction, is needed for driving than in the known linear magnet. This creates the possibility of making the dosing device extendible instead of foldable, so that a tearing strip in the holder, when it is designed as a so-called bag in box, can be omitted. This provides the advantage that making the box operational involves a simpler operation. In particular, accordingly, the holder is provided with a bag formed from flexible sheetlike material, in which the concentrate is contained, and a housing in which the bag is accommodated.

The invention also relates to an apparatus for preparing a beverage suitable for consumption, the apparatus being adapted to be charged with a holder as mentioned hereinbefore. The apparatus comprises a magnetization unit for generating at least one magnetic field which changes so as to drive the rotor to allow the dosing device to dispense concentrate from the holder in a metered manner. The apparatus further comprises means for diluting the dispensed concentrate with water for obtaining the beverage suitable for consumption. The magnetization unit can be provided with a magnet and driving means for rotating a magnet for generating the changing magnetic field. It is also possible, however, that the magnetization unit is provided with a plurality of coils for generating the changing magnetic field. The invention also relates to an assembly comprising an apparatus for preparing a beverage suitable for consumption and a holder as described hereinbefore. The apparatus is adapted to be loaded with the holder, the apparatus comprising driving means for driving the dosing device to cause the dosing device to dispense concentrate from the holder in a metered manner, and means for diluting the dispensed concentrate with water for obtaining the beverage suitable for consumption.

The invention will presently be further explained with reference to the drawings, in which:

FIG. 1 also shows a magnetization unit of an apparatus for preparing a beverage suitable for consumption;

Figure 1:
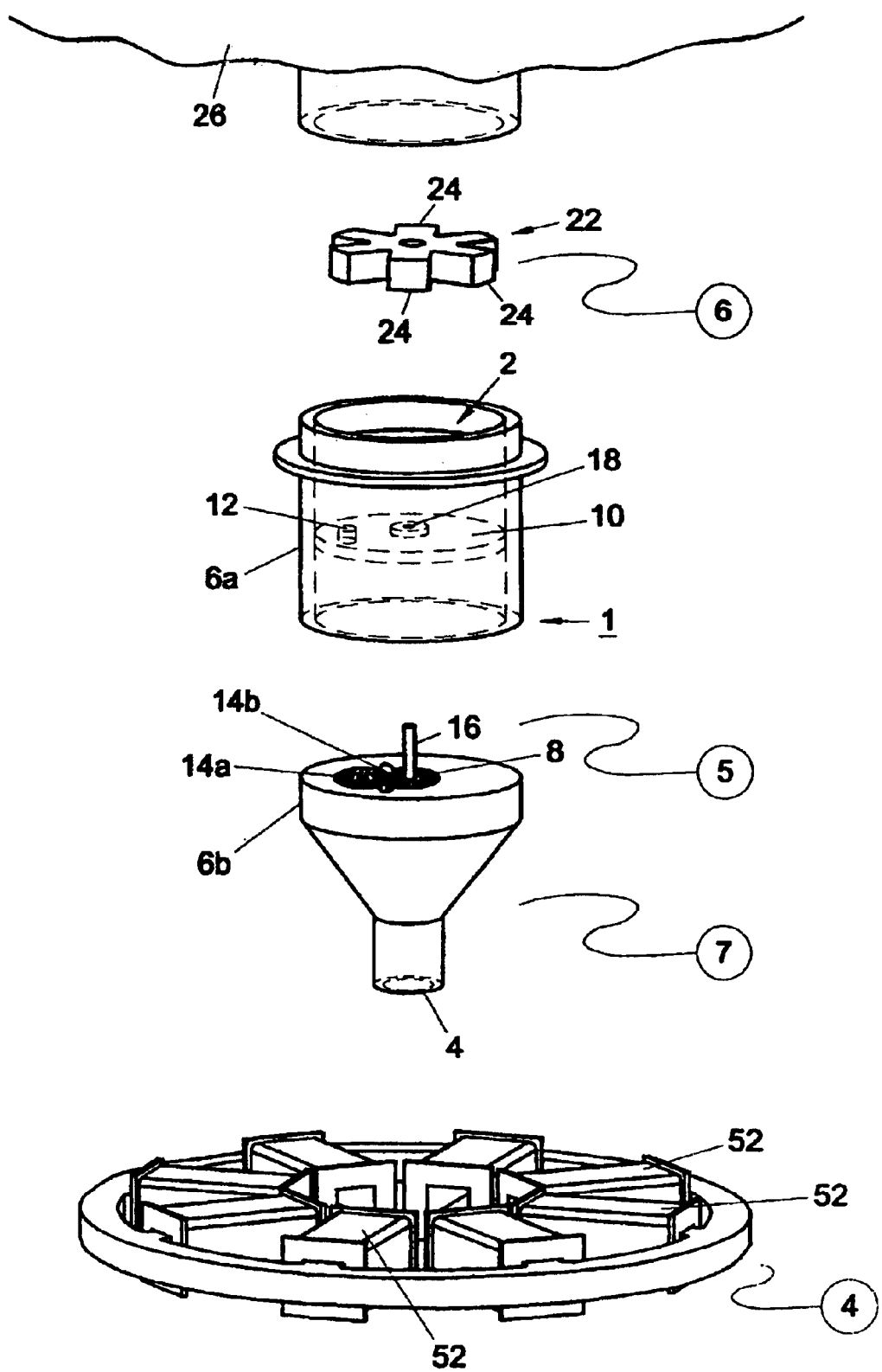
FIG. 1 shows an exploded view of a possible embodiment of a dosing device according to the invention, which is connected to a holder according to the invention.
Figure 2:
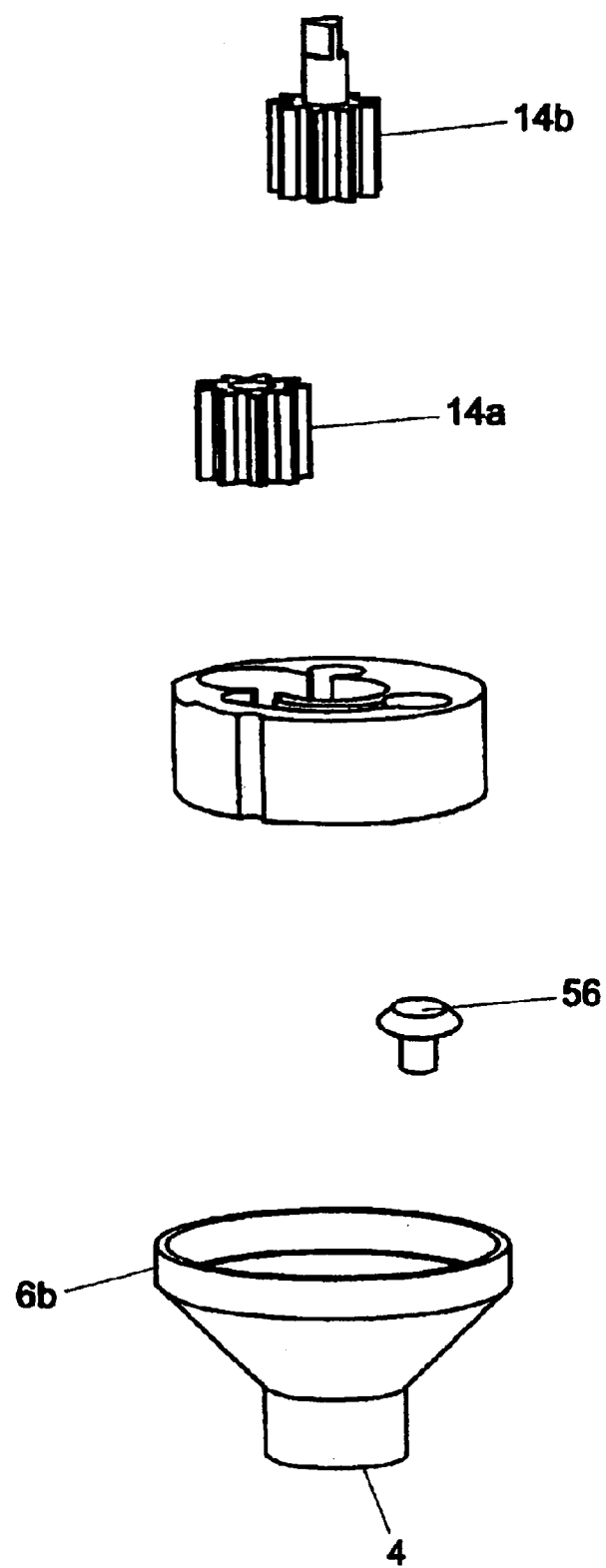
FIG. 2 shows a number of parts of the dosing device according to FIG. 1.
Figure 3:
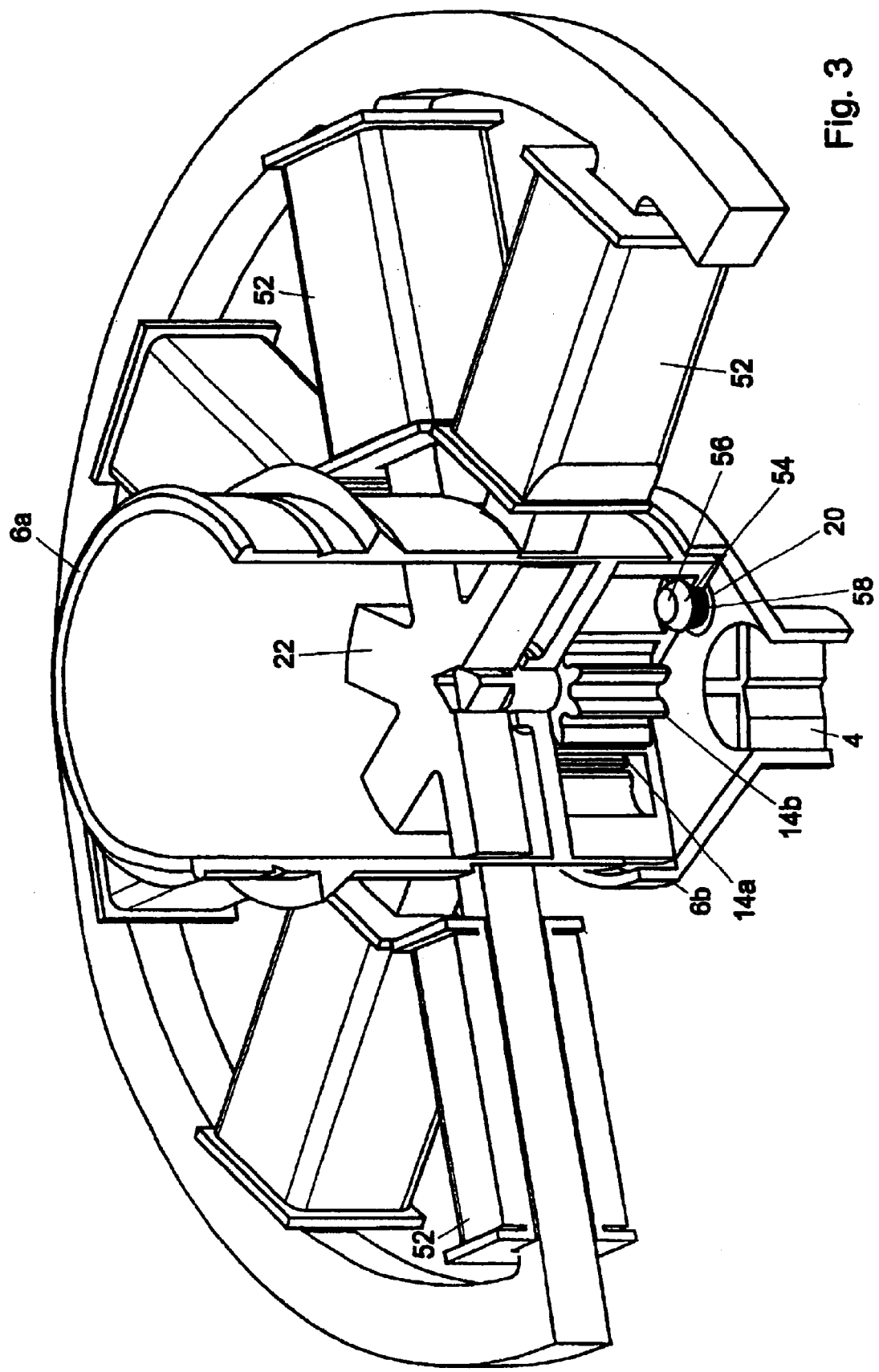
FIG. 3 shows a number of parts of the dosing device and the apparatus for preparing a beverage suitable for consumption according to FIG. 1.
Figure 5A:
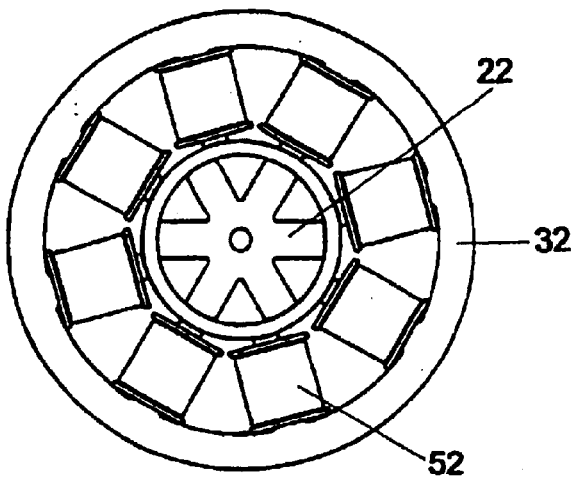
FIG. 5a shows a top plan view of the dosing device according to FIG. 1 which is placed in the magnetization unit according to FIG. 1.
Figure 5B:
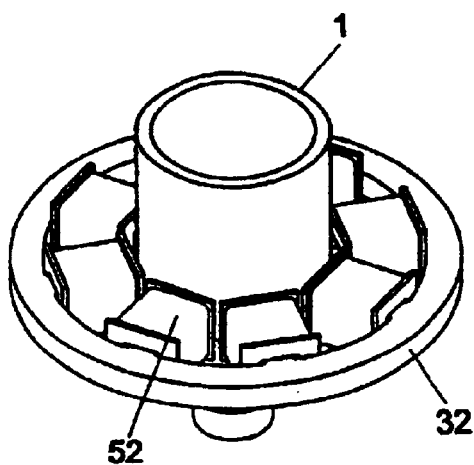
FIG. 5b shows a view of the dosing device according to FIG. 1 which is placed in the magnetization unit according to FIG. 1.
Figure 4A:
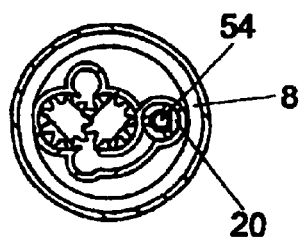
FIG. 4a shows a top plan view of the gear pump of the dosing device according to FIG. 1.
Figure 4B:
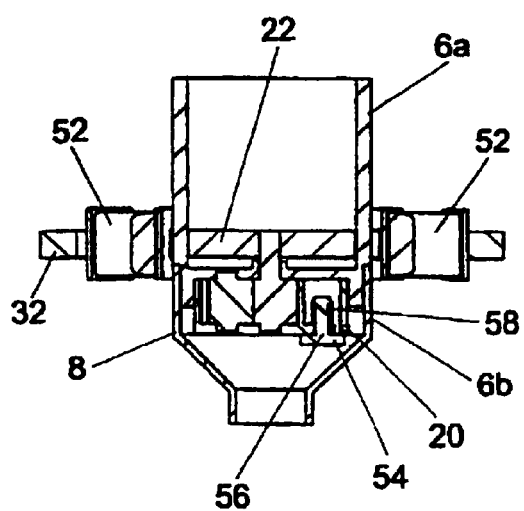
FIG. 4b shows a cross section of the dosing device according to FIG. 1 which is placed in the magnetization unit of FIG. 1.

In FIGS. 1–6, reference numeral 1 indicates a dosing device according to the invention. The dosing device comprises an inlet 2 and at least one outlet 4.

The liquid flow path extends from the inlet 2 to the outlet 4. In this example, the dosing device comprises a housing 6a and 6b composed of two parts, which is rotation-symmetrical around an axis which is directed in the direction of the liquid flow path.

In the housing 6a, 6b, a pump 8 is included. The pump 8 is here designed as a gear pump. At the top, the gear pump 8 comprises a covering plate 10 having an inflow opening 12. The inflow opening 12 is in fluid communication with a space where the teeth of, in this case two, gearwheels 14a and 14b mesh. The gearwheel 14b is driven by a drive shaft 16 which in mounted condition extends through an opening 18 of the covering plate 10. The gear pump 8 is provided at its underside with an outflow opening 20 for dispensing liquid. The drive shaft 16 is so directed that an axial axis of this drive shaft is directed in the direction from the inlet 2 to the outlet 4. In this example, the housing 6a, 6b is designed to be substantially rotation-symmetrical around the axial axis, likewise extending in the direction from the inlet 2 to the outlet 4.

In this example, the dosing device is provided, upstream of the gear pump 8, with a rotor 22 connected mechanically with the gear pump, in this example connected mechanically with the rotary shaft 16. In mounted condition, this rotor 22 is disposed above the covering plate 10. The rotor is adapted to be driven by means of a changing magnetic field, for the purpose of driving the gear pump 8.

Figure 6:
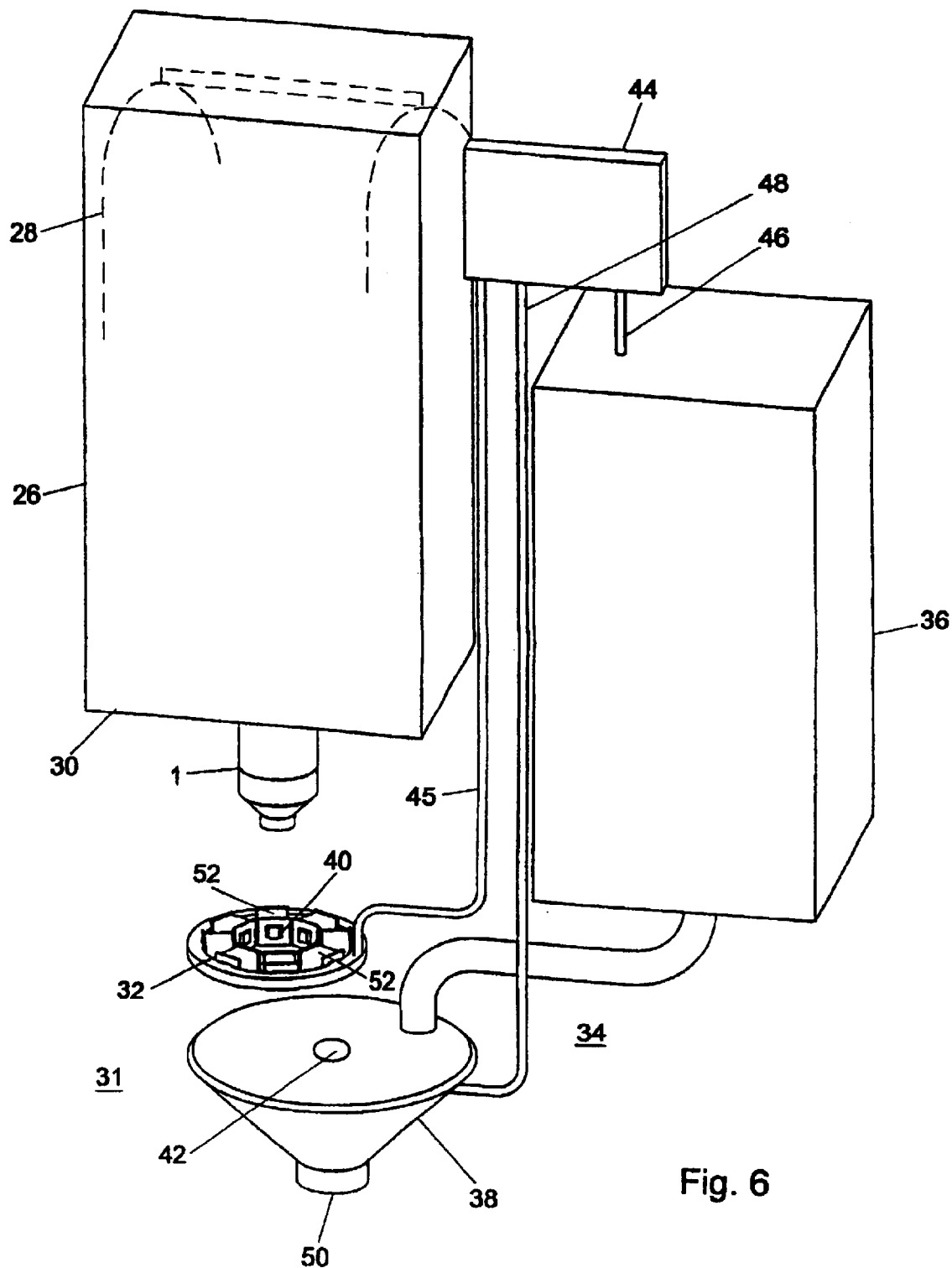
FIG. 6 shows a holder with a dosing device according to the invention, an apparatus for preparing a beverage suitable for consumption according to the invention, and an assembly comprising the apparatus and the holder according to the invention.

In this example it holds, further, that the rotor 22 is included in the liquid flow path mentioned. In this example, the rotor is provided with a permanent magnet for contactlessly driving the rotor by means of at least one magnetic field. In particular it holds, in this example, that the rotor comprises a plurality of arms 24 extending in radial direction of the rotation axis (drive shaft 16). More particularly, there are only two arms, disposed in line with each other and hence forming a beamlike body. The ends of the arms form poles of the permanent magnet mentioned. The poles of the permanent magnet will want to follow the changing magnetic field, which has as a result that the rotor and the drive shaft 16 will start to rotate. The device described up to this point works as follows. Suppose that the inlet 2 of the dosing device is connected to a holder 26, shown schematically in FIGS. 1 and 6, in which an amount of concentrate, such as, for instance, coffee concentrate, is present. The holder 26, as shown best in FIG. 6, is fitted with the dosing device according to FIG. 1. In this example, the holder 26 includes a bag 28 (indicated by broken lines), formed by a flexible sheetlike material, in which the concentrate is contained, and a housing 30 in which the bag 28 is accommodated. The housing 30 is preferably made of substantially rigid design and hence is more rigid than the bag 28. The inlet 2 of the dosing device is in fluid communication with the inside of the bag 28. By presently generating a magnetic field changing in a predetermined manner, the rotor 22 will start to rotate in a predetermined manner. As a consequence, the gear pump 8 will likewise start to rotate, with the result that concentrate flows via the inflow opening 12 and the space between the teeth of the gearwheels to the outflow opening 20 mentioned. Thus the amount of concentrate dispensed in a metered manner corresponds with the angle of rotation through which the rotor 22 is rotated. The relation is substantially linear.

In FIG. 6, reference numeral 31 designates an apparatus for preparing a beverage suitable for consumption. The apparatus 31 is adapted to be loaded with the holder 26. The apparatus 31 comprises a magnetization unit 32 for generating the changing magnetic field referred to for driving the rotor. Further, the apparatus comprises means 34 for diluting the concentrate dispensed by the dosing device 1 with water. These means 34 comprise a hot water generator 36 and a mixing unit 38. In use, the housing 6a, 6b of the dosing device is inserted through an opening 40 of the magnetization device, such that the outlet 4 of the dosing device reaches into an opening 42 of the mixing device 38. A control unit 44 of the apparatus 31 controls the magnetization unit 32 via line 45, such that a changing magnetic field is generated which causes the rotor 22 to rotate through a predetermined angle of rotation. As a result, from the holder 26 a predetermined amount of concentrate is dispensed to the mixing device 38. The control unit 44 also activates the hot water unit 36 and the mixing unit 38 via respective electrical lines 46 and 48. As a result, hot water is sent from the hot water unit 36 to the mixing unit 38. In the mixing unit, the hot water is mixed with the dispensed concentrate, after which the concentrate, in diluted condition and hence in the condition of a beverage suitable for consumption, leaves an outlet opening 50 of the apparatus 31.

In this example, the magnetization unit 32 comprises a plurality of coils 52 for generating the changing magnetic field.

The invention is not limited in any way to the embodiments outlined hereinabove. Thus, the rotor 22 may also be provided exclusively with soft iron. Magnetization of the rotor is then effected by the magnetic field of the magnetization unit 31. The rotor will want to orient in this changing magnetic field, so that the rotation is effected. The rotor 22 may also be driven, in a manner known per se, as is known for an eddy current motor. Upon rotation of the rotor, fly-back pulses arise in the coils 52 of the magnetization device which are not energized.

It is also possible that the coils 52 are replaced by permanent magnets, these magnets being mechanically rotated for generating the changing magnetic field.

Further, in the outflow opening 20 referred to, a valve 54 may be included which opens when the liquid pressure upstream of the valve exceeds a predetermined threshold value. This involves a so-called non-return valve comprising a shut-off member 56 with a spring 58 which is schematically shown in this example. The valve 54 can also be designed as a so-called step valve.

In this example, the housing 6a and 6b is made of a suitable plastic. The gearwheels 14a and 14b and the drive shaft 16 are also made of plastic. The only metal part is therefore the rotor 22. It is also possible that the rotor is included in the liquid flow path downstream of the gear pump. Such variants are all understood to fall within the scope of the invention.

What is claimed is:

1. A dosing device removably located in a dispensing machine which dispensing machine comprises a magnetization unit for generating a changing magnetic field, said dosing device comprising a housing comprising at least one inlet, at least one outlet, a liquid flow path extending from the inlet to the outlet, and a pump included in the liquid flow path, the dosing device being adapted for dispensing in a metered manner a viscous concentrate from a holder in which the concentrate is contained, the concentrate in diluted form giving a product suitable for consumption, the holder comprising a storage space in which the concentrate is contained, and the inlet of the dosing device being adapted to be connected, in use, to the storage space of the holder, wherein the dosing device comprises a rotor rotatably connected to the housing for rotation around a rotation axis, for causing the rotor to rotate about the rotation axis in response to the changing magnetic field of said magnetization unit, the pump being mechanically connected to the rotor for driving the pump in response to the rotation of the rotor by changing the magnetic field.

2. A dosing device according to claim 1, wherein the rotor is included in the liquid flow path.

3. A dosing device according to claim 2, wherein the rotor is included in the liquid flow path upstream of the pump.

4. A dosing device according to claim 1, wherein the rotor is provided with a magnetizable material such as soft iron.

5. A dosing device according to claim 1, wherein the rotor comprises a permanent magnet for contactlessly driving the rotor by means of at least one magnetic field.

6. A dosing device according to claim 5, wherein the ends of the arms form poles of the permanent magnet.

7. A dosing device according to claim 1, wherein the rotor comprises a plurality of arms extending in radial direction of the rotation axis.

8. A dosing device according to claim 1, wherein the pump is driven by the rotor by way of a drive shaft of which an axial axis is directed in a direction from the inlet to the outlet.

9. A dosing device according to claim 1, wherein the housing of the dosing device is of substantially rotation-symmetrical design, with an axial axis of the housing extending in the direction from the inlet to the outlet.

10. A dosing device according to claim 1, wherein the dosing device is provided, downstream of the pump, with a valve included in the liquid flow path, which opens when the liquid pressure upstream of the valve exceeds a predetermined threshold valve.

11. A dosing device according to claim 1, wherein the pump is constructed as a gear pump.

12. A holder for filling with concentrate, which in diluted form, is suitable for consumption, the holder comprising a dosing device according to claim 1.

13. A holder according to claim 12, wherein the holder comprises a bag formed from a flexible sheetlike material in which the concentrate is contained, and a housing in which the bag is received.

14. A holder according to claim 13, wherein the inlet of the dosing device is connected to the bag.

15. A holder according to claim 12, wherein the housing is of more rigid design than the bag.

16. An assembly comprising an apparatus for preparing a beverage suitable for consumption and a holder according to claim 12, the apparatus being loaded with the holder, and the apparatus comprising a driver for driving the dosing device for the dosing device to dispense concentrate from the holder in a metered manner, and a diluter for the dispensed concentrate for obtaining the beverage suitable for consumption.

17. An assembly according to claim 16, wherein the holder is detachably connected to the apparatus.

18. An apparatus for preparing a beverage suitable for consumption, the apparatus being adapted to be loaded with a holder for filling with concentrate, which in diluted form, is suitable for consumption, the holder comprising a dosing device for placement in a dispensing machine, the dosing device comprising a magnetization unit for generating a changing magnetic field comprising a housing comprising at least one inlet, at least one outlet, a liquid flow path extending from the inlet to the outlet, and a pump included in the liquid flow path, the dosing device being adapted for dispensing in a metered manner a viscous concentrate from a holder in which the concentrate is contained, the concentrate in diluted form giving a product suitable for consumption, the holder comprising a storage space in which the concentrate is contained, and the inlet of the dosing device being adapted to be connected, in use, to the storage space of the holder, wherein the dosing device comprises a rotor rotatably connected to the housing for rotation around a rotation axis, for causing the rotor to rotate about the rotation axis by means of the changing magnetic field, the rotor being mechanically connected to the pump for driving the pump with the rotating rotor, the apparatus comprising a magnetization unit for generating at least one magnetic field changing such that the rotor is contactlessly driven by the magnetization unit for the dosing device to dispense concentrate from the holder in a metered manner, and a diluter for the dispensed concentrate with water for obtaining the beverage suitable for consumption.

19. An apparatus according to claim 18, wherein the magnetization unit comprises a magnet and a driver for rotating the magnet for generating the changing magnetic field.

20. An apparatus according to claim 18, wherein the magnetization unit comprises a plurality of coils.

21. An assembly comprising an apparatus for preparing a beverage suitable for consumption and a holder for filling with concentrate, which in diluted form, is suitable for consumption, wherein the holder comprises a dosing device for placement in a dispensing machine which comprises a magnetization unit for generating a changing magnetic field, the dosing device comprising a housing comprising at least one inlet, at least one outlet, a liquid flow path extending from the inlet to the outlet, and a pump included in the liquid flow path, the dosing device being adapted for dispensing in a metered manner a viscous concentrate from the holder, the holder further comprising a storage space in which the concentrate is contained, and the inlet of the dosing device being adapted to be connected, in use, to the storage space of the holder, wherein the dosing device comprises a rotor rotatably connected to the housing for rotation around a rotation axis, for causing the rotor to rotate about the rotation axis by means of the changing magnetic field, the rotor being mechanically connected to the pump for driving the pump with the rotating rotor, characterized in that the apparatus further comprises a magnetization unit for generating at least one magnetic field changing such that the rotor is driven for causing the dosing device to dispense concentrate from the holder, the apparatus being loaded with the holder, and the apparatus further comprising a driver for driving the dosing device for the dosing device to dispense concentrate from the holder in a metered manner, and a diluter for the dispensed concentrate with water for obtaining the beverage suitable for consumption.

22. An assembly according to claim 21, wherein the magnetization unit comprises a magnet and a driver for rotating the magnet for generating the changing magnetic field.

23. An assembly according to claim 21, wherein the magnetization unit comprises a plurality of coils.

* * * * *